US 8,126,803 B2
Feb. 28, 2012

(12) United States Patent
Elliott et al.

(54) AUTOMATED FLOAT PRICING FOR GEOGRAPHICALLY DISTRIBUTED DEPOSITS AND ACCOUNTS

(75) Inventors: Douglas P. Elliott, Kennedale, TX (US);
David McMann, Garland, TX (US);
Lowell R. Huff, Manchester, MO (US);
Lynn Flesher, Celina, TX (US);
Clarence E. Lee, II, Arlington, TX (US); David Frew, Fort Mill, SC (US);
Kelly S. Hall, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 449 days.

(21) Appl. No.: 11/774,687

(22) Filed: Jul. 9, 2007

(65) Prior Publication Data
US 2009/0018939 A1     Jan. 15, 2009

(51) Int. Cl.
G06Q 20/00     (2006.01)
(52) U.S. Cl. .................................................. 705/38
(58) Field of Classification Search ................ 705/38
See application file for complete search history.

(56) References Cited

U.S. PATENT DOCUMENTS

| | | | | |
|---|---|---|---|---|
| 3,195,810 | A * | 7/1965 | Fettig et al. ............. | 235/60 MT |
| 4,918,602 | A * | 4/1990 | Bone et al. ................ | 705/1.1 |
| 5,802,499 | A * | 9/1998 | Sampson et al. .......... | 705/35 |
| 6,029,153 | A * | 2/2000 | Bauchner et al. ......... | 705/42 |
| 6,052,672 | A * | 4/2000 | Foster ....................... | 705/35 |
| 6,988,084 | B1 * | 1/2006 | DiBacco ................... | 705/38 |
| 2002/0138432 | A1 * | 9/2002 | Makino et al. ............ | 705/43 |
| 2004/0133516 | A1 * | 7/2004 | Buchanan et al. ........ | 705/42 |
| 2004/0267660 | A1 * | 12/2004 | Greenwood et al. ...... | 705/38 |
| 2005/0165676 | A1 * | 7/2005 | Foster ....................... | 705/39 |
| 2006/0059087 | A1 * | 3/2006 | Smith et al. ............... | 705/40 |
| 2006/0080255 | A1 * | 4/2006 | Riehl et al. ................ | 705/45 |
| 2006/0143099 | A1 * | 6/2006 | Partlow et al. ............ | 705/35 |
| 2006/0213980 | A1 * | 9/2006 | Geller et al. .............. | 235/380 |
| 2007/0043657 | A1 * | 2/2007 | Koenigsman et al. .... | 705/38 |
| 2007/0285723 | A1 * | 12/2007 | Fabel et al. ............... | 358/1.18 |

FOREIGN PATENT DOCUMENTS

WO     WO 0208984     *     1/2002     ................ 705/38

OTHER PUBLICATIONS

"Remake Float Department from Cost to Profit Center," Mar 2, 1995, Item Processing Report, vol. 6, No. 4.*
"Float Hunt Yields Substantial Gains for Midlantic," Mar. 6, 1991, Financial Services Report, vol. 8, No. 5.*

(Continued)

*Primary Examiner* — Alexander Kalinowski
*Assistant Examiner* — Ann Loftus
(74) *Attorney, Agent, or Firm* — Moore & Van Allen PLLC; Ryan Harris

(57) ABSTRACT

An automated system can be provided for continuously and accurately assigning float to deposit credits within a financial institution. A normalized market segment is continuously assigned to each account by extracting information from a plurality of disparate demand deposit account systems. Deposit credits are gathered from disparate known capture sites and the normalized market segment is assigned to a deposit credit for a corresponding account. A float assignment can then be made for a deposit credit so that the float reflects both a deposit location and current domestic information for the corresponding account. A system for implementing the invention can include a float system connected to a transaction exchange system.

24 Claims, 8 Drawing Sheets

OTHER PUBLICATIONS

"Client Suggestions Made to Flexi-Check Software," Oct. 28, 1993, vol. 4, No. 21.*
"Remake Float Department from Cost to Profit Center," Mar. 2, 1995, Item Processing Report, vol. 6, No. 4.*
"Major Players Join to Offer Float Management Service," Oct. 9, 2001, PRNewswire.*
"Security Pacific VP offers Service, Product Management Float Tips," Apr. 17, 1991, Financial Services Report, vol. 8, No. 8.*

Bank of America Corporation, PCT International Search Report, issued in corresponding International Patent Application No. PCT/US2008/069507, Sep. 3, 2008.
Bank of America Corporation, PCT Written Opinion, issued in corresponding International Patent Application No. PCT/US2008/069507, Sep. 3, 2008.
International Preliminary Report on Patentability mailed Jan. 21, 2010 for International Application No. PCT/US2008/069507.

* cited by examiner

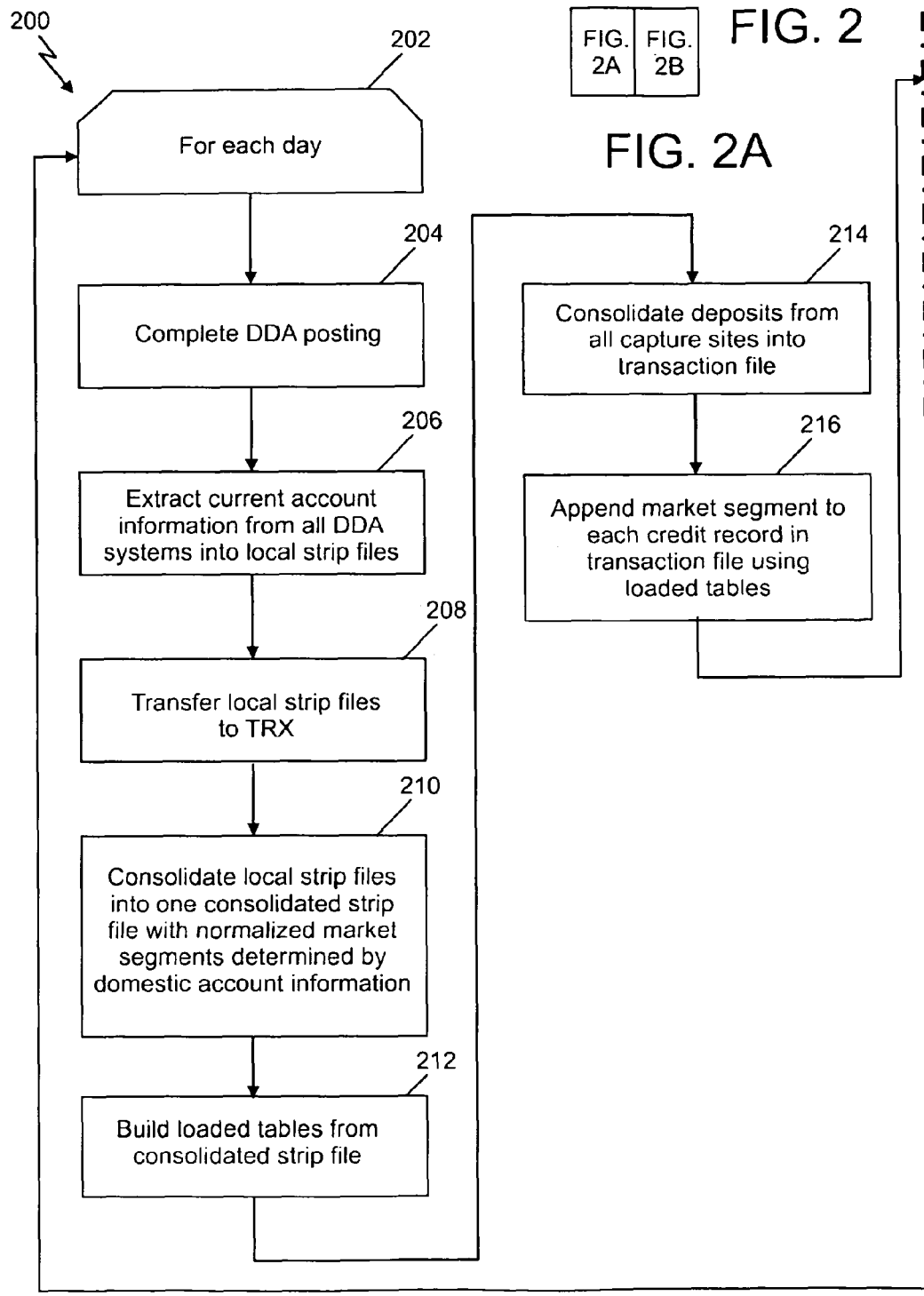

AUTOMATED FLOAT PRICING FOR GEOGRAPHICALLY DISTRIBUTED DEPOSITS AND ACCOUNTS

BACKGROUND

In the banking industry, "float" is a term used for the difference between the ledger balance and the collected balance for a demand deposit bank account. When a deposit is credited to an account, the funds that go with the deposit credit may take time to collect. For example, if the credit is a check, the depositary bank must ultimately present the check (either physically or electronically, directly or through intermediaries) for collection to the drawer's bank. The drawer's bank then transfers the funds to the depositary bank. During the time it takes for presentment and funds transfer, the ledger balance on the account reflects the deposit, but the collected balance, which is the balance of actual funds in the possession of the depositary bank, does not reflect the deposit.

For consumers, legislation and/or regulations require that banks make funds corresponding to deposit credits available on a specific schedule without fee, regardless of whether the funds have been collected. However, banks typically charge business and other non-consumer customers for use of funds corresponding to a deposit credit prior to collection. The fee charged for the use of such funds can also be referred to as "the float" attached to the deposit credit. The term "float" can also refer to the sum of all of these fees being collected at any given time. In fact, most large banks treat "float" for non-consumer customers as a product that is managed and creates revenue just as any other product within the bank.

Float pricing in modern banks must take many factors into account. The type of customer must be considered, as well as any special terms regarding float that might be contained in the agreement between the bank and the customer. As with any other product, the actual cost of providing float to a customer, which may include costs related to collection, volume, and the duration of the float, must also be taken into account. Historically, banks assigned commercial account numbers within specific ranges or with specific formats to customers as a way of at least partially fixing float characteristics for accounts. Today, however, many large banks have been formed from mergers and acquisitions, creating not only accounts with numbers that don't match up to previously used schemes, but in some cases even duplicate account numbers. Accounts can be spread across different demand deposit account (DDA) systems. Also, account characteristics are often changing. For example, the home location or "domicile" of an account might change as a bank gets reorganized, resulting in the need to reevaluate the float pricing for the account. Thus, float pricing can be a labor intensive process for bank management.

SUMMARY

Embodiments of the present invention provide an automated system for continuously and accurately assigning float pricing characteristics to deposit credits within a financial institution. In example embodiments, a normalized market segment is continuously and/or repeatedly assigned to each account by extracting information for a plurality of accounts from a plurality of disparate demand deposit account systems to determine current domestic information for each of the plurality of accounts. The market segment is assigned based on this current domestic information. Deposit credits are gathered from disparate known capture sites. The normalized market segment is then assigned to any deposit credit for a corresponding account. A float assignment can then be produced for a deposit credit so that the float price reflects both a deposit location and the current domestic information for the corresponding account.

In some embodiments, information from the various DDA systems is stored in a plurality of strip files to be consolidated to obtain current domestic information. Deposit credits from a plurality of capture sites can be consolidated into a transaction file, and the normalized market segment can be appended to the deposit credit in the transaction file. Once a float assignment is made to a deposit credit, the deposit credit and the float assignment can be forwarded to an account analysis system and/or a balance reporting system. In addition to reflecting current domestic information, such as the domicile of the account, the process can be set up so that the float assignment reflects a float product code, a capture site, a delivery source, and/or a delivery location. The float assignment can include an availability schedule and a pricing tier for the deposit credit.

A system for implementing embodiments of the invention can include a transaction exchange (TRX) to assign normalized market segments a plurality of accounts, consolidate deposit credits from a plurality of capture sites into a transaction file, and assign one of the normalized market segments to a deposit credit for a corresponding account. The system can also include a float system functionally connected to the TRX, to produce the float assignment for the deposit credit. Computing resources that make up the system of the invention in combination with appropriate computer program code can provide the means to implement an embodiment of the invention.

In some embodiments, a consolidation server is connected to the TRX and a plurality of capture sites to obtain the deposit credits from the capture sites. Additionally, the float system can include a float control file to determine availability by market segment and domicile for the corresponding account, and float tables to provide the availability schedule and the pricing tier pricing schedule. In some embodiments the float tables are disposed in an item control file in the float system.

BRIEF DESCRIPTION OF THE DRAWINGS

FIG. 2A is a flowchart illustrating a method according to example embodiments of the invention.

DETAILED DESCRIPTION OF THE INVENTION

Figure 1:
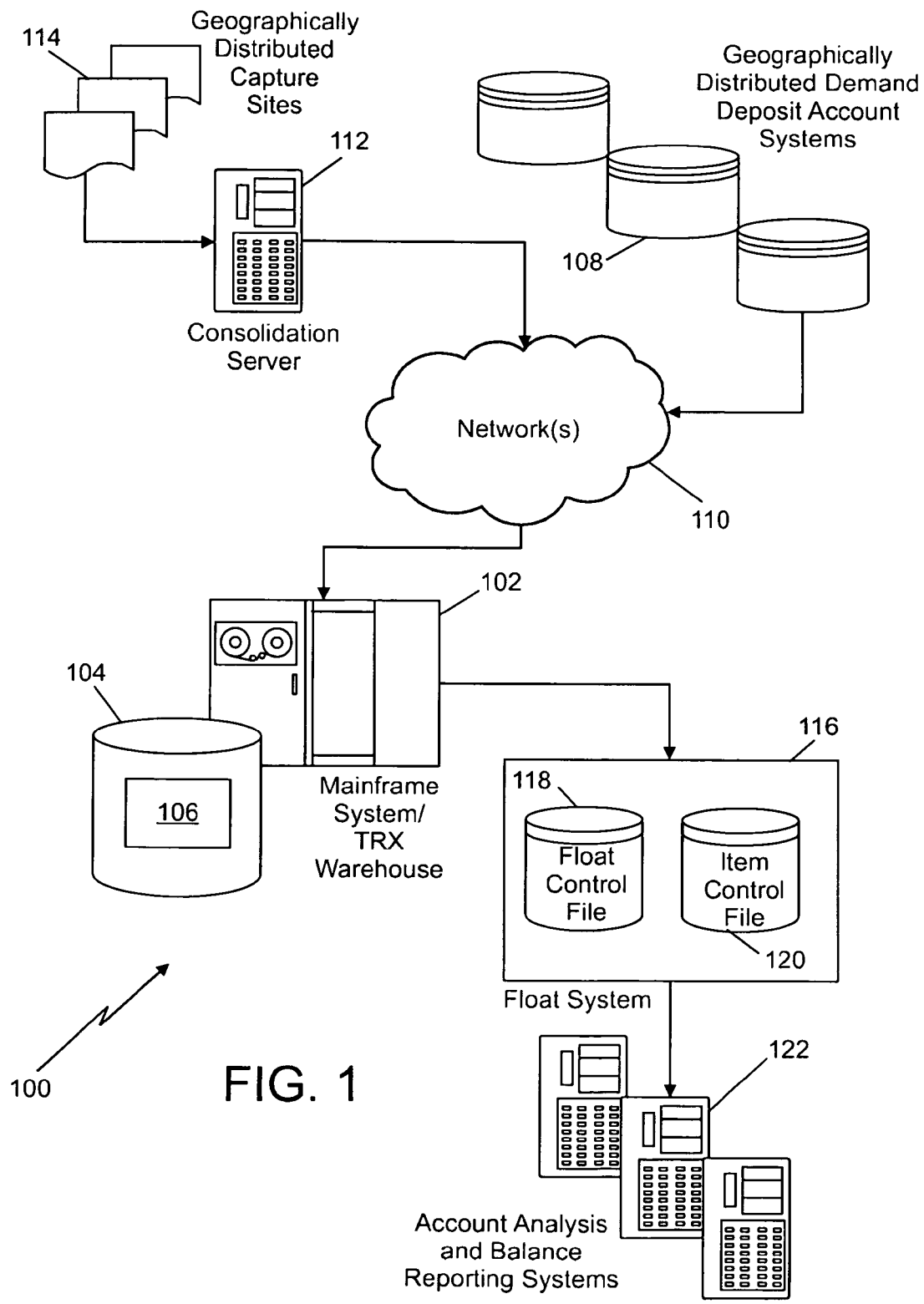
FIG. 1 is a system block diagram illustrating the operating environment and the system components for some example embodiments of the invention.

The following detailed description of embodiments refers to the accompanying drawings, which illustrate specific embodiments of the invention. Other embodiments having different structures and operation do not depart from the scope of the present invention.

As will be appreciated by one of skill in the art, the present invention may be embodied as a method, system, computer program product, or a combination of the foregoing. Accordingly, the present invention may take the form of an entirely hardware embodiment, or an embodiment combining software (including firmware, resident software, micro-code, etc.) and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet.

In the context of this document, a computer usable or computer readable medium may be any medium that can contain, store, communicate, or transport the program for use by or in connection with the instruction execution system, apparatus, or device.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

The term "bank" and any similar terms are used herein in their broadest sense. Financial institutions that process transactions and documents of the types discussed can include stock brokerages, credit unions, and other types of institutions which are not strictly banks in the historical sense. Even retail and other service businesses, as well as manufacturers may process documents and/or data as disclosed herein. The use of terms such as bank, "institution" or "franchise" herein is meant to encompass all such possibilities.

There are additional terms used herein, the definitions of which may aid the reader in an understanding of this disclosure from this point forward. Other terms either have their ordinary meaning within the art, or will be defined when used. The term "domestic information" and similar terms such as "domestic account information" refer to information about a demand deposit account which resides where the account is based. For example, the domicile of the account is part of the domestic information. Domestic information may also include unique items related to pricing and customer agreements for the specific account, when such items are housed and maintained at a specific location within the franchise as opposed to or in addition to being controlled centrally. Part of the domestic information may be a market segment for the account. However, with financial institutions that have grown over time through mergers and acquisitions, market segments assigned to accounts may be completely different from one location to another. Thus, the market segment as domestic information should be distinguished from a "normalized market segment" which is also referenced herein. Normalized market segments are used throughout a franchise to define the type of customer that holds an account. For example, there may be dozens and dozens of market segments defined on a location by location basis which need to be consolidated into a very small set of market segments that are used universally throughout the institution. Domestic information might also include the type of demand deposit account system that maintains the records of an account. This may in turn affect schedules, the information is recorded for a particular account, and other similar factors.

A "float availability schedule" and a "tier pricing schedule" as referred to herein are meant to invoke the normal meaning as is understood in the art with respect to float systems that handle many accounts and transactions. Float systems are well known within the banking industry, and typically use schedules to determine a float price for a deposit credit. The float availability schedule typically determines the amount of time an item floats based on the domicile location of an account as well as the location of a deposit. A tier pricing schedule assigns float pricing based on the float availability schedule. A pricing tier and an availability schedule as used independently herein are generally intended to refer to the specific schedule and pricing tier assigned to a deposit credit. These two items together may be referred to herein as a "float assignment."

At various places throughout this disclosure the concept of a "transaction exchange" is mentioned. The transaction exchange may also be referred to simply as "TRX." In the example embodiments discussed herein, TRX is a data repository or a warehouse and its associated processing platforms which serve to manage the reading and writing of information to databases. TRX can be used as a processing platform to provide external applications with the ability to store, count, extract, and process transactions. A transaction exchange can collect data in increments, consolidate the data, and redistribute it. A TRX can receive transactions from upstream systems, store the transactions within the data warehouse repository, and distribute the transactions as needed. In the example embodiments, the TRX is implemented by a computer platform with high availability and reliability as well as associated database. Such platforms are known in the art and can be based on many different types of operating systems. In some embodiments, such platforms include and input stage to receive data, a reformatter to format the data as desired, a processing core which provides execution and control functions for the system, and associated database storage systems. A transaction exchange system as used herein may also include an output stage and output reformatter to format data to be provided to other systems.

In the embodiments discussed herein, TRX receives "strip files" from various demand deposit accounting systems. In at least some embodiments, these strip files are individual files from various demand deposit accounting systems that include updated information for all of the accounts whose information is stored within a specific system. For example, the strip file will include the account number, account name, and the localized market segment or type of account as well as any ancillary information that is needed to identify the account apart from all other accounts.

FIG. 1 is system block diagram for example embodiments of the present invention. In this example, mainframe computer system 102 houses TRX and its associated data warehouse stores. Mainframe computer system 102 may be referred to herein as the "TRX mainframe" or the like. Like most computer systems, the mainframe system 102 includes a fixed storage medium, 104, for storing programs and/or data which enable an embodiment of the invention. These programs can include all or a portion of a computer program product which implements an embodiment of the present invention. Such a computer program product is graphically illustrated as computer program instructions 106. Mainframe system 102 can execute the appropriate instructions and display appropriate information through peripheral devices (not shown). Computer system 102 can include connectivity to receive strip files and other information from geographically distributed demand deposit account (DDA) systems 108. In this example, this connectivity is a connection to network 110, which can be an intranet, virtual private network (VPN) connection, local area network (LAN) connection, or any other type of network connection as well as the Internet. In most cases information traversing this network would be encrypted so that a "secure pipe" is formed between computer system 102 and other systems with which it exchanges data. TRX computer system 102 is also connected to consolidation server 112 via network 110.

The consolidation server gathers deposit credits from geographically distributed capture sites 114. The consolidation server can support data gathering from outside the financial institution. The consolidation server is a computer server that can provide a destination for inbound deposit, X9.37, XML, "EIPS" and other types of files. EIPS is a format used by systems marketed by the NCR Corporation of Dayton, Ohio, United States. Within the consolidation server, files may be processed singularly or batched with other files to create a larger unit of work.

Still referring to FIG. 1, float system 116 is functionally connected to TRX computer system 102. Float system 116 provides a float assignment for a deposit credit using a float availability schedule and a tier pricing schedule. The float system used with example embodiments of the invention includes float control file 118 and item control file 120. The float system will be discussed in further detail later with respect to FIG. 6. Float system 116 outputs deposit credits with their appropriate float assignment to account analysis and balance reporting systems 122.

An account analysis system provides a highly developed service charge program employed by banks to charge their customers for services provided to the customer. These service charges are offset with a calculated credit amount determined from a customer's collected balances. Some examples include charges for deposited item counts based on where a deposited check is drawn, monthly charges for balance reporting, charges for deposit tickets, charges for outgoing and/or incoming wire transfers, and charges for other unique services offered by the franchise.

A balance reporting system provides a specialized service to bank customers by presenting a customer with credit, debit, and float activity for an account. Knowing this information allows a customer to appreciate the customer's daily liquidity position with the financial institution. The service is typically provided either on-line or by telephone. Such a system provides transaction details for either a current day's or the previous day's banking activity.

Figure 2B:
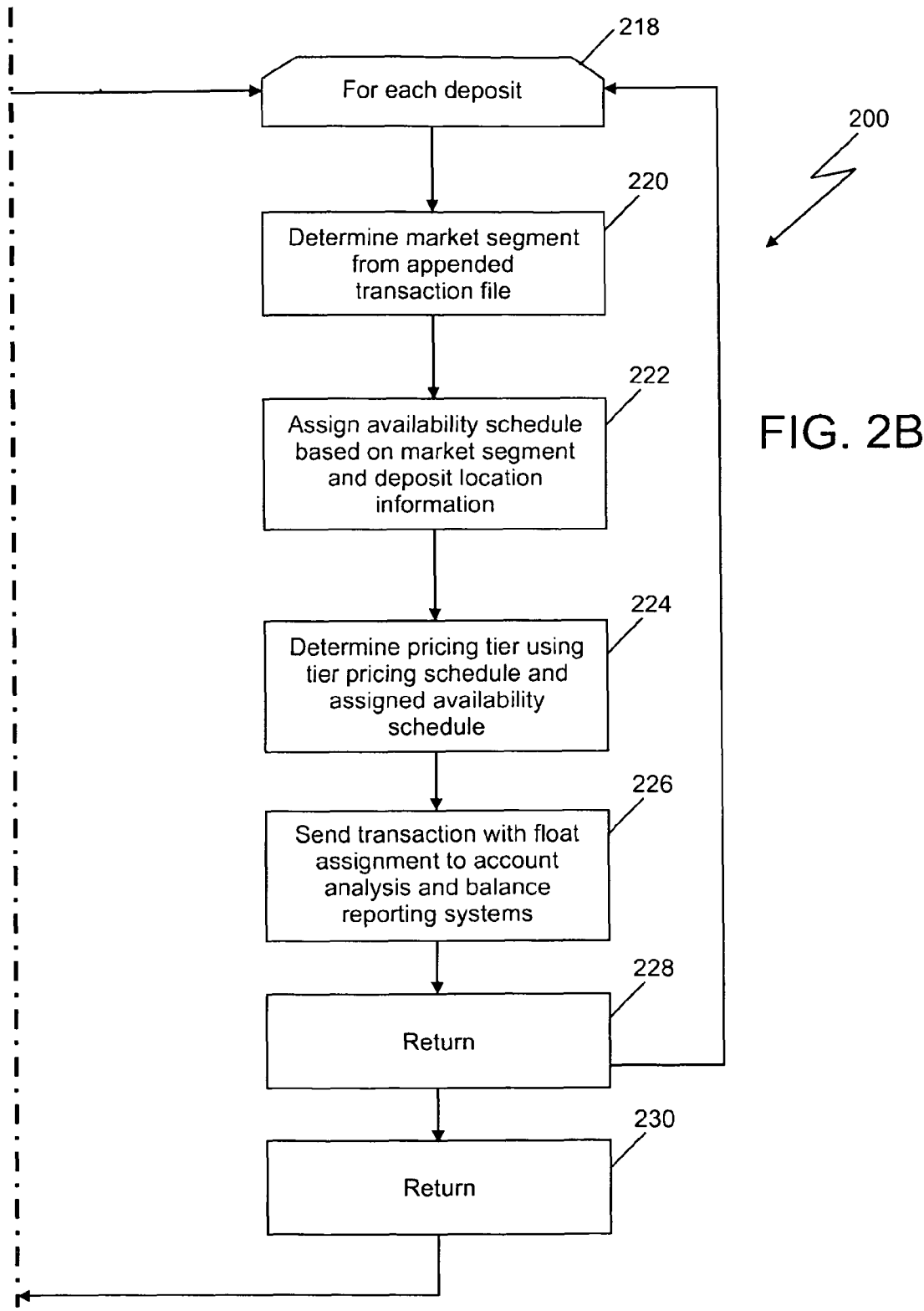
FIG. 2B is a continuation of the flowchart in FIG. 2A illustrating a method according to example embodiments of the invention.

FIGS. 2A and 2B represents a high level process, 200, for an example embodiment of the invention. FIGS. 2A and 2B are presented in flowchart form. Like most flowcharts, FIGS. 2A and 2B represent process 200 as a series of process or subprocess blocks. It should be noted that there is no start or end block in FIGS. 2A and 2B. This characteristic of process 200 schematically illustrates the fact that it is a continuous process. Account characteristics and deposit credits are gathered continuously, or at least repeatedly, for example, at the close of business every day. In a geographically distributed financial institution, multiple time zones are involved, possibly increasing the number of times data is received in the central repository. The continuous nature of process 200 allows the system to take into account changes on a day-to-day basis, for example, when an account changes from a regular account to a small business account or from a checking account to a savings account. Such currency can be important because different types of accounts would have different types of float pricing. Additionally, an account may be moved from one cost center to another cost center within the financial institution for accounting purposes. Such accounting information can also form part of the domestic information on which float pricing can be partially based. The continuous nature of process 200 enables an embodiment of the invention to work with very large numbers of accounts across a geographically distributed franchise. The continuous nature of process 200 also enables float pricing of deposit credits from a variety of widely distributed capture sites and/or deposit locations.

In the particular example of FIG. 2A, loop limit 202 defines a loop that in this example is executed each business day. The decision as to how often to execute process 200 is an engineering and business choice which can be made by those of skill in the art implementing an embodiment of the invention. At block 204, demand deposit account (DDA) posting is completed. At block 206, current account information is extracted from all DDA systems and placed into local strip files. These local strip files are transferred to TRX at block 208. At block 210, in this example embodiment, the TRX system consolidates the local strip files into one consolidated strip file wherein a normalized market segment is determined and assigned to each account. As previously discussed, the normalized market segment for a particular account may or may not be exactly the same as a locally defined market segment which may have been included in the local strip file received from a particular location. At block 212 of FIG. 2A, loaded tables are constructed from the consolidated strip file which was rendered in block 210. A loaded table is essentially a subset of information from the consolidated strip file. This subset of information is stored as a series of tables that make up the loaded tables. A plurality of loaded tables is used for processing in this example embodiment so that information can be accessed at a high rate of speed.

Still referring to FIGS. 2A and 2B, most of the rest of process 200 relates to dealing with deposit credits. At bock 214, deposit credits are consolidated from all capture sites into a single transaction file. This consolidation can take place either in TRX or at the previously mentioned consolidation server. At block 216, loaded tables created previously at block 212 are accessed in order to append a normalized market segment to each credit record in the transaction file. Loop limit 218 defines processing for individual deposits. At block 220, the market segment for a deposit is determined from the transaction file with market segment information appended as previously discussed. At block 222, an availability schedule is assigned to a deposit credit based on market segment and deposit location information. At block 224, the float assignment for a deposit credit is determined using the availability schedule and the tier pricing schedule. Since the current domestic information for each of the plurality of accounts in the system was gathered and evaluated in order to assign a normalized market segment to the deposit credit, the float as assigned using the float availability schedule and tier pricing schedule of the float system reflects both the deposit location and the current domestic information for the corresponding account. At block 226, the transaction and its float assignment are sent to the account analysis and balance reporting systems. Block 228 marks the return point for the processing loop defined by loop limit 218, and block 230 marks the return point for the processing loop defined by block 202

To supplement the high level view of a system and method of an example embodiment of the invention. a more detailed description of an embodiment is provided. It is important to keep in mind that the float assigned to a deposit credit can reflect many factors, not only domicile of the account and location of the deposit. The purpose of repeatedly extracting information for a plurality of accounts resident at disparate demand deposit account systems is to maintain currency of the domestic information for each of the accounts stored in the central system. Also, the assignment of a normalized market segment to an account rather than using location specific market segments allows consistency and speed in making float pricing determinations. In example embodiments, a financial institution is presented in which much of the geographic organization is based on the various states of the United States. However, it should be noted that this organization is arbitrary, and may not apply at all if the invention is implemented outside of the United States. Bearing in mind the exemplary nature of this disclosure, the domicile of an account might also be called the posting state of the account.

Market segments have thus far been discussed in the abstract. Examples of the types of market segments which may be useful to establish within a financial institution include an internal market segment, an international market segment, a small business market segment, a commercial interest bearing market segment, a consumer non-interest bearing market segment, a consumer interest bearing market segment, a middle market segment, other financial institutions, community banks, and any other market segments which may be specifically defined to meet the needs of a specific financial institution. A delivery identifier can also be used as a parameter for float pricing. The delivery identifier designates the geographic location where a deposit for an account is taken. Delivery identifiers can be organized in the same manner as domicile information, for example, by state. Capture sites are also taken into account in some embodiments. The capture site for a deposit credit is the specific location where the credit was entered into the bank's systems. A delivery source can also be considered. The delivery source identifies the type of system at which the deposit was taken or entered. Note that a float assignment can be and often is determined for all transactions, even transactions for consumer accounts for which a specific float charge is not made. For interest-bearing consumer accounts, the interest paid is based on the customer's collected balance, taking float into account. For non-interest-bearing consumer accounts, the float assignment may be used for cost allocation purposes.

The capture site, the delivery identifier, and the delivery source can be important because these items reflect the cost of collection, and the time required to actually perform the collection, of a deposit credit. Finally, in some financial institutions, various types of float offerings will be given product codes. Such product codes might reflect whether the customer is image enabled, the type of system the customer uses to make deposits to the financial institution, settlement requirements, and the like. These float product codes again reflect the cost of capturing deposit credits and the time involved in collecting against the credits. As would be typical of any float system, time zone considerations can also be taken into account.

Characteristics for accounts within a franchise are gathered almost continuously so that the most current information is available for float pricing. Domestic information and deposit location information for each deposit credit is combined with other information such as time zone information on a daily basis. Thus, the situation where a customer is domiciled at a specific location and serviced by a specific branch of the financial institution, but that customer makes deposits in many far flung locations, can be handled appropriately with respect to float pricing.

Figure 3A:
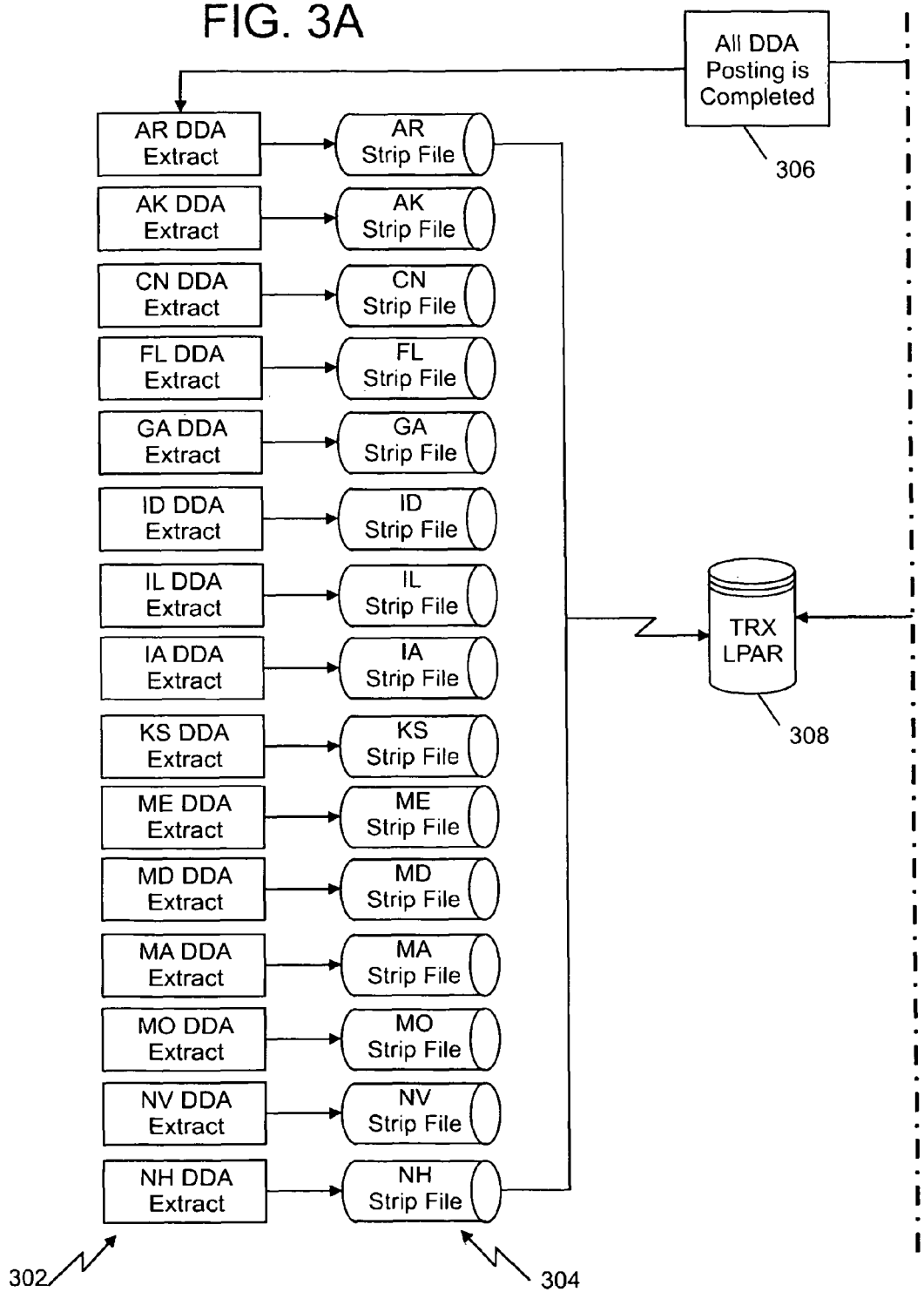
FIG. 3A is a schematic block diagram illustrating details of obtaining local strip files at the TRX mainframe system according to example embodiments of the invention.
Figures 3, 3B:
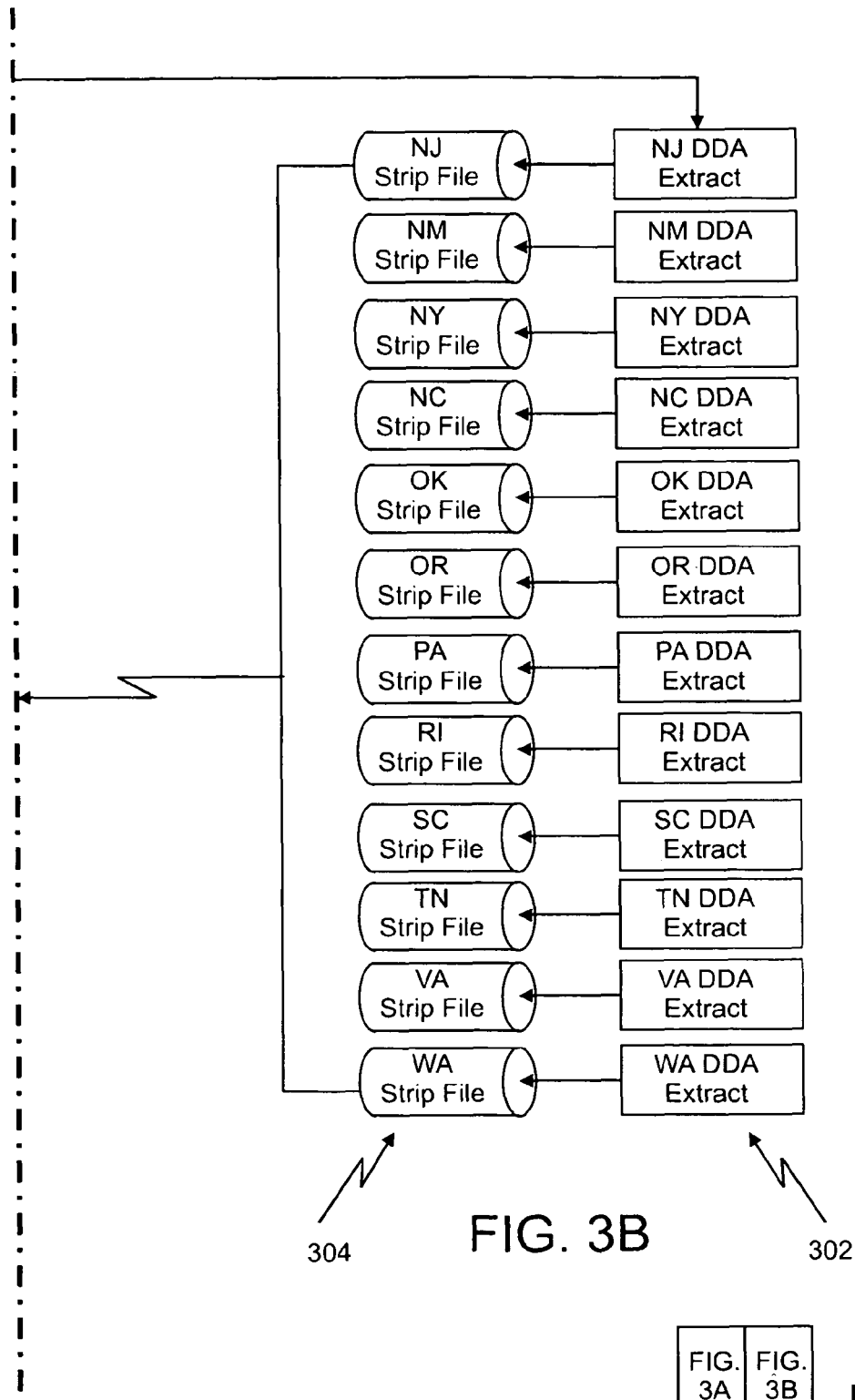
FIG. 3B is a continuation of the schematic block diagram in FIG. 3A illustrating details of obtaining local strip files at the TRX mainframe system according to example embodiments of the invention.

FIG. 3A and 3B present a schematic block diagram which illustrates details of obtaining local strip files at the TRX mainframe system. Extraction routines 302 are located throughout the various DDA systems of the financial institution. Each one extracts a local strip file, 304, when triggered by routine 306 which recognizes when all posting is completed for a given day. As previously discussed, in this example, DDA systems are shown broken down by state. However, in many circumstances, there may be multiple DDA systems within a state, and even DDA systems which run on different platforms and software, each of which might be taken into account and may have data to be extracted. In this example embodiment, all of the local strip files are forwarded over the network to logical partition (LPAR), 308 which resides on the TRX mainframe computer system.

As previously mentioned, a strip file contains market segment information for the accounts that it covers. However, this market segment information may be local in nature and may not correspond to any bank-wide market segments being used for float pricing. Strip files may also contain other information which is subject to change, again resulting in the need to continuously gather information from the DDA systems. For example, accounts may be reclassified or assigned to different cost centers for accounting purposes. Accounts may be moved from one DDA system to another, or the type of account may be changed. The extracting of account information into local strip files on a repeated, ongoing basis helps maintain current information within the central system.

Figure 4:
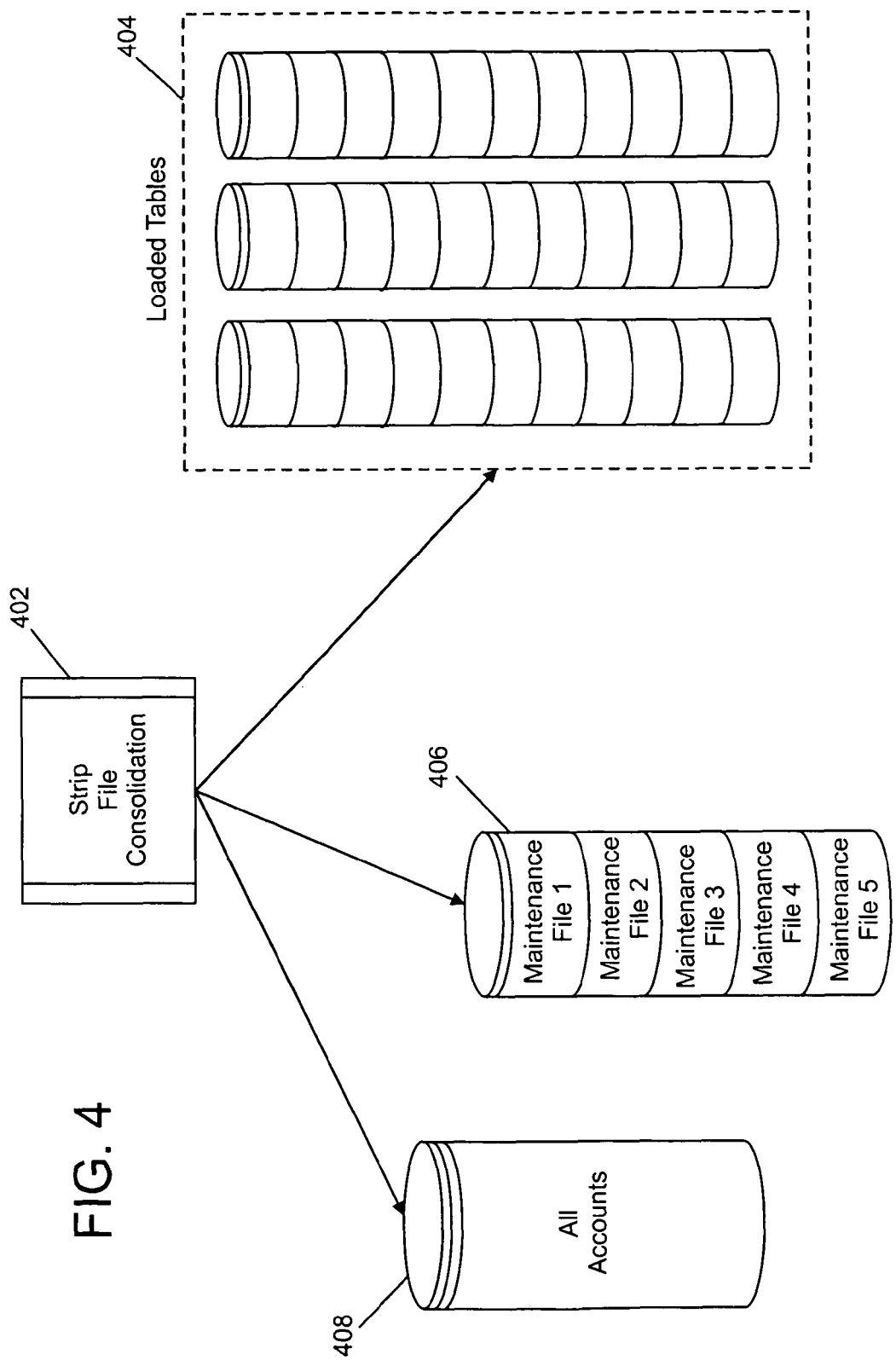
FIG. 4 is a schematic block diagram illustrating strip file consolidation and loaded table creation according to example embodiments of the invention.

FIG. 4 presents a schematic block diagram which illustrates strip file consolidation and loaded table creation in example embodiments of the invention. In this example, strip file consolidation subroutine 402 resides on the TRX system. A single strip file is created and broken down into loaded tables 404. The information from the large strip file is broken down into many loaded tables in order to facilitate high speed access to the information from the strip file. In this example embodiment, a series of maintenance files 406 is created from the large strip file consolidated by subroutine 402. An all accounts file, 408, is also created and stored by the strip file consolidation subroutine. All accounts file 408 is a large online file which allows real time access to specific account information by bank personnel throughout the franchise. As previously mentioned, loaded tables 404 are made up of float tables based on domestic account information. The loaded tables contain the same information which was present in the consolidated strip file, but it is broken down into logically organized tables for faster access.

Figure 5:
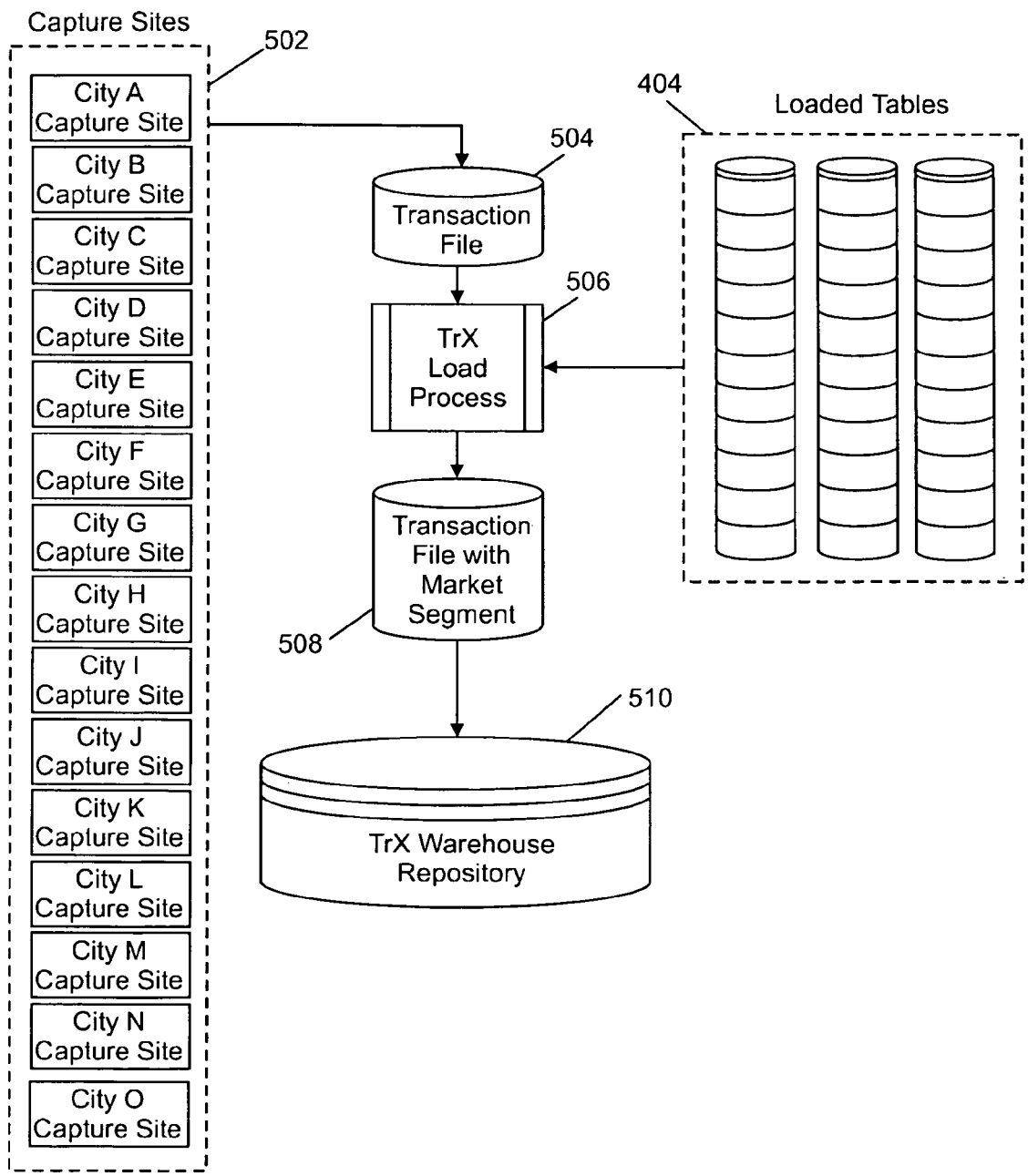
FIG. 5 is a schematic block diagram illustrating how deposit credit information is captured to create a file with the normalized market segment appended for each deposit credit according to example embodiments of the invention.

FIG. 5 is a schematic block diagram illustrating how deposit credit information is captured to create a file with the normalized market segment appended for each deposit credit. Deposit credit information is gathered from a variety of capture sites, which may be geographically distributed. In this example, capture sites are designated by the city in which they are located. It cannot be overemphasized that this designation is but an example only. The system of the example embodiments can gather information from decentralized sources and prepare the information for centralized processing regardless of how the decentralized sources are organized.

Still referring to FIG. 5, information from the various capture sites is consolidated into transaction file 504. Load process 506 accesses loaded tables 404 to create transaction file 508 with a normalized market segment appended to each transaction record. The appended transaction file, 508, is then stored in TRX warehouse repository 510. It should be noted that the processing of deposit credits by reference to loaded tables as described in FIG. 5 is not limited to being synchronized with the gathering of information from DDA systems, which may only occur at the end of each business day. On the contrary, the process of FIG. 5 can be carried out continuously, 24 hours a day, 7 days a week, even if the extracting and gathering of information from DDA systems takes place at relatively infrequent intervals. Data can always be at the ready to be used in making float pricing determinations.

Figure 6:
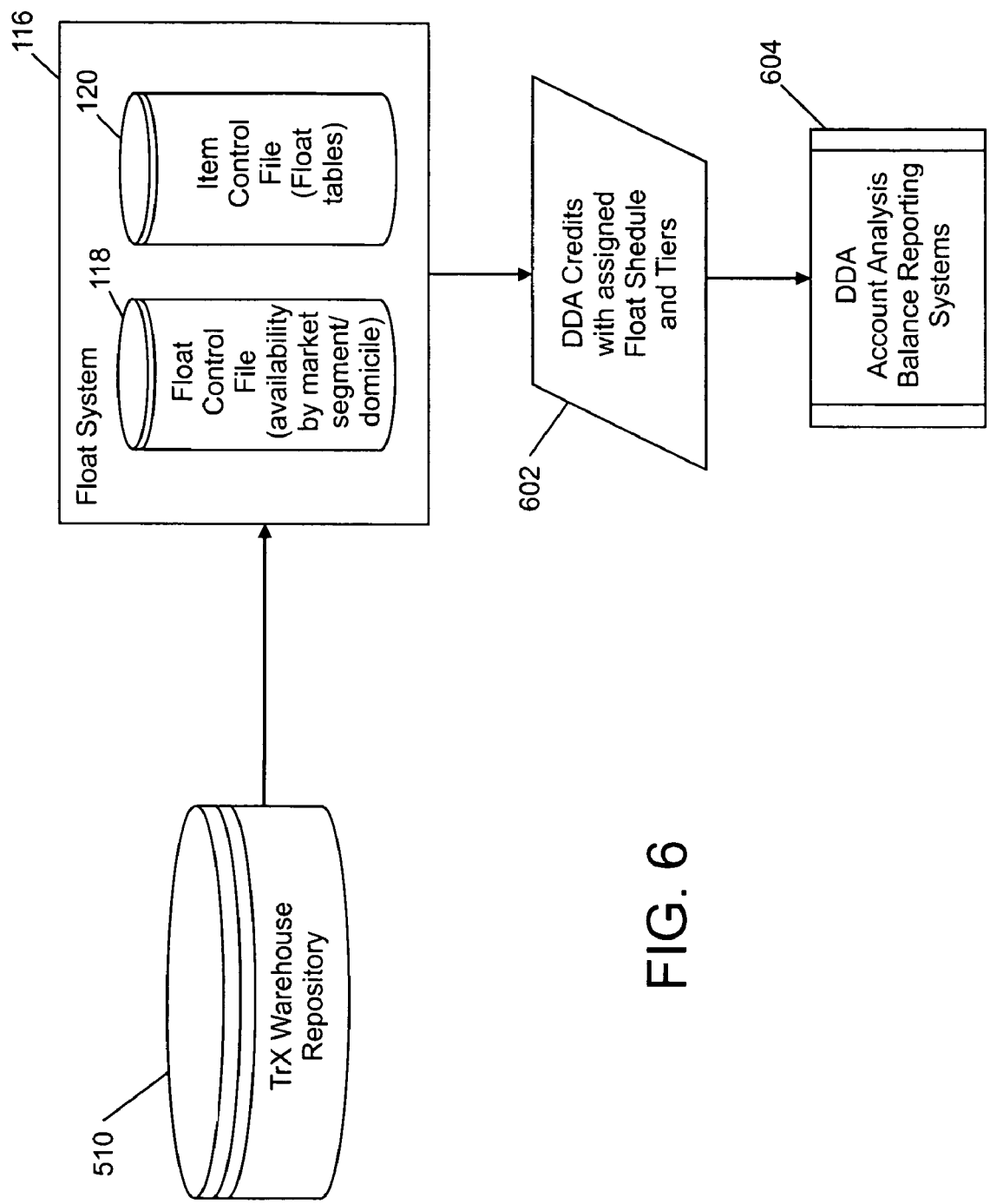
FIG. 6 is a schematic block diagram illustrating float assignment generation according to example embodiments of the invention.

FIG. 6 is a schematic block diagram illustrating float assignment generation according to example embodiments of the invention. TRX warehouse repository 510 supplies information to float system 116, which was previously discussed with reference to FIG. 1. Float assignment is made by float system 116 so that the float can be posted at the same time as the deposit credit. Float control file 118 contains a mapping of normalized market segment and domicile to float availability. The float control file provides a mechanism to determine how a customer's float should be handled given the domicile of the account and the location of the deposit credit. The float control file translates this information to an availability schedule for the deposited funds. This availability schedule can be assigned precisely since information is known about both the deposit location and the domestic characteristics of the corresponding account.

Still referring to FIG. 6, item control file 120 contains float tables which reflect the float availability schedule and tier pricing schedule used for all of the accounts within the financial institution. In a typical financial institution, a tier typically represents a category of pricing. The tier is converted to an actual price for a specific float of a specified amount of finds elsewhere in the system as is known in the art. Once the float assignment is made by float system 116, the deposit credits with the assigned float information, 602, are forwarded to processing routines 604 within the account analysis and balance reporting systems. An availability schedule for a deposit credit is selected from a plurality of float availability schedules that are set based on the amount of time it takes to collect on a deposit credit given geography, time zones, and additional process considerations. A pricing tier is selected from a tier pricing schedule which takes into account the float sensitivity of a customer, volume, and other factors, which would have a bearing on float, as are known in the art.

The strip files support the float system of FIG. 6 by passing the float market segment of a deposit to the transaction exchange, so that the float market segment can be taken into consideration by the float system. The float control file uses the defined market segments to assign a float availability schedule and tier index to a deposit. On the debit level, the item control file then assigns a float rule using the routing/transit number. The float rule is contained within the availability schedule assigned by the float control file. Similarly, a tier price code is assigned based on the routing/transit number from a tier assignment file (not shown) in float system 116. The item control file can include information in multiple formats. In example embodiments, the information is provided in a queued sequential access method (QSAM) format and a binary search load table format for more frequent random lookups.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, action, or portion of code, which comprises one or more executable instructions or actions for implementing the specified logical function(s). It should also be noted that, in some alternative implementations, the functions noted described herein may occur out of the order presented, depending upon the functionality involved. It will also be noted that each block of the block diagrams and/or flowchart illustrations, and combinations of blocks in the block diagrams and/or flowchart illustrations, can be implemented by special purpose hardware-based systems or operators which perform the specified functions or acts.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Additionally, comparative, quantitative terms such as "above", "below", "less", "greater", are intended to encompass the concept of equality, thus, "less" can mean not only "less" in the strictest mathematical sense, but also, "less than or equal to."

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A method of assigning float in a financial institution, the method comprising:
   repeatedly extracting, through the use of a processor, information for a plurality of accounts from a plurality of disparate demand deposit account systems to determine current domestic information for each of the plurality of accounts, the current domestic information comprising the current domicile of the account;
   assigning, through the use of a processor, one of a plurality of normalized market segments to each of the plurality of accounts based at least in part on the current domicile for each of the plurality of accounts;
   assigning, through the use of a processor, one of the plurality of normalized market segments to a deposit credit for a corresponding account of the plurality of disparate demand deposit accounts; and
   producing, through the use of a processor, a float assignment for the deposit credit based at least in part on the normalized market segment assigned to the deposit credit and the corresponding account so that the float reflects both a deposit location and the current domestic information for the corresponding account.

2. The method of claim 1 wherein the repeatedly extracting information further comprises storing the information in a plurality of strip files.

3. The method of claim 1 wherein the assigning of the normalized market segment further comprises:
   consolidating a plurality of deposit credits from a plurality of capture sites into a transaction file; and
   appending the normalized market segment to the plurality of deposit credits in the transaction file.

4. The method of claim 3 further comprising forwarding each of the plurality of deposit credits and the float assignments to at least one of an account analysis system and a balance reporting system.

5. The method of claim 2 wherein the assigning of the normalized market segment further comprises:
   consolidating a plurality of deposit credits from a plurality of capture sites into a transaction file; and
   appending the normalized market segment to the plurality of deposit credits in the transaction file.

6. The method of claim 5 further comprising forwarding each of the plurality of deposit credits and the float assignments to at least one of an account analysis system and a balance reporting system.

7. The method of claim 1 wherein the float assignment includes an availability schedule and a pricing tier.

8. The method of claim 2 wherein the float assignment includes an availability schedule and a pricing tier.

9. The method of claim 4 wherein the float assignments include availability schedules and pricing tiers.

10. The method of claim 6 wherein the float assignments include availability schedules and pricing tiers.

11. A computer program product for assigning float to deposit credits in a financial institution, the computer program product including a non-transitory computer-readable medium having computer program code embodied therein, the computer program code comprising:
    instructions for repeatedly extracting information for a plurality of accounts from a plurality of disparate demand deposit account systems to determine current domestic information for each of the plurality of accounts, the current domestic information comprising the current domicile of the account;
    instruction for assigning one of a plurality of normalized market segments to each of the plurality of accounts based at least in part on the current domicile for each of the plurality of accounts;
    instructions for assigning one of the plurality of normalized market segments to a deposit credit for a corresponding account of the plurality of disparate demand deposit accounts; and
    instructions for making a float assignment to the deposit credit based at least in part on the normalized market segment assigned to the deposit credit and the corresponding account so that the float reflects both a deposit location and the current domestic information for the corresponding account.

12. The computer program product of claim 11 wherein the computer program code further comprises instructions for storing the information in a plurality of strip files.

13. The computer program product of claim 11 wherein the computer program code further comprises:
    instructions for consolidating a plurality of deposit credits from a plurality of capture sites into a transaction file; and
    instructions for appending the normalized market segment to the plurality of deposit credits in the transaction file.

14. The computer program product of claim 13 wherein the computer program code further comprises instructions for forwarding each of the plurality of deposit credits and the float assignments to at least one of an account analysis system and a balance reporting system.

15. The computer program product of claim 12 wherein the computer program code further comprises:
    instructions for consolidating a plurality of deposit credits from a plurality of capture sites into a transaction file; and
    instructions for appending the normalized market segment to the plurality of deposit credits in the transaction file.

16. The computer program product of claim 15 wherein the computer program code further comprises instructions for forwarding each of the plurality of deposit credits and the float assignments to at least one of an account analysis system and a balance reporting system.

17. The computer program product of claim 11 wherein the float assignment includes an availability schedule and a pricing tier.

18. The computer program product of claim 12 wherein the float assignment includes an availability schedule, and a pricing tier.

19. The computer program product of claim 14 wherein the float assignments include availability schedules and pricing tiers.

20. The computer program product of claim 16 wherein the float assignments include availability schedules and pricing tiers.

21. Apparatus for assigning float to deposit credits, the apparatus comprising:
    means for extracting information for a plurality of accounts from a plurality of disparate demand deposit account systems to obtain current domestic information for each of the plurality of accounts, the current domestic information comprising the current domicile of the account;

means for assigning one of a plurality of normalized market segments to each of the plurality of accounts based at least in part on the current domicile for each of the plurality of accounts;

means for assigning one of the plurality of normalized market segments to a deposit credit for a corresponding account of the plurality of disparate demand deposit accounts; and means for making a float assignment to the deposit credit based at least in part on the normalized market segment assigned to the deposit credit and the corresponding account so that the float reflects both a deposit location and the current domestic information for the corresponding account.

22. The apparatus of claim 21 further comprising means for storing the information in a plurality of strip files.

23. The apparatus of claim 22 further comprising:
means for consolidating a plurality of deposit credits from a plurality of capture sites into a transaction file; and
means for appending the normalized market segment to the plurality of deposit credits in the transaction file.

24. The apparatus of claim 23 further comprising means for forwarding each of the plurality of deposit credits and the float assignments to at least one of an account analysis system and a balance reporting system.

* * * * *